HOLDING CIRCUIT ALLOWING PULSE TO BE GATED FOR PREDETERMINED TIME SET BY CHARGING CIRCUIT

Filed Oct. 26, 1961

INVENTOR.
Guelino A. Lucchi
BY
Floyd M. Harris
Attorney

United States Patent Office 3,115,586

Patented Dec. 24, 1963

3,115,586

HOLDING CIRCUIT ALLOWING PULSE TO BE GATED FOR PREDETERMINED TIME SET BY CHARGING CIRCUIT

Guelino A. Lucchi, San Fernando, Calif., assignor to Radio Corporation of America, a corporation of Delaware Filed Oct. 26, 1961, Ser. No. 147,809
7 Claims. (Cl. 307—88.5)

The present invention relates to improved time delay or holding circuits and particularly to an improved holding circuit suitable for use in the transmission of an identification pulse from a radio transponder.

In the operation of airborne transponders which transmit a code reply in response to an interrogation, it is sometimes desired that the transponder transmit an identification pulse. This is a pulse that follows the series of pulses comprising the code reply. It may be desired that the identification pulse be included in the transponder reply for a period of from five to thirty seconds, for example. It is also desired that the operator of the transponder shall be required merely to close a switch momentarily, rather than having to hold it closed, to make the transponder transmit the identification pulse for the required period.

An object of the present invention is to provide in a transponder an improved time delay or holding circuit that will actuate a gate circuit for a substantial predetermined period after the momentary closing of a switch to permit transmission of an identification pulse.

A further object of the invention is to provide an improved time delay or holding circuit for the production of a gate or control pulse of predetermined and comparatively long duration in response to the momentary actuation of a switch.

In one preferred embodiment of the invention a transistor is normally held non-conducting by a flow of current through a biasing diode, this current also flowing through an isolating diode and a capacitor-resistor storage circuit. The transistor is made conducting for a predetermined period, such as ten seconds, by the momentary closing of a switch which applies a back bias to the isolating diode to interrupt the current flow through the biasing diode whereby the transistor becomes conducting to produce the desired gate pulse that lasts as long as the transistor remains conducting. Closing the switch also results in an increased charge on the storage capacitor in the direction to hold the isolating diode back biased. The isolating diode remains back biased until sufficient charge has leaked off the capacitor to permit it again to conduct, at which time current again flows through the biasing diode causing the transistor to become non-conducting thereby terminating the gate pulse. During the gate pulse period leakage currents of the transistor cannot affect the time constant of the storage circuit because it is isolated from the transistor by the isolating diode. Therefore the storage circuit may be given a long time constant, the value of which is affected by temperature changes only insofar as the capacitor and resistor of the storage circuit are affected by temperature changes.

Thus, the holding circuit will produce a gate or control pulse of long duration and of a predetermined duration that is substantially independent of temperature changes, or is affected by such changes to only a minor extent.

Figure 1:
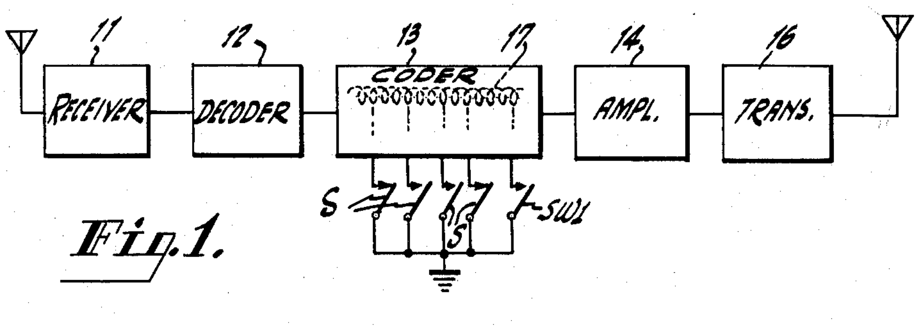
Figure 2:
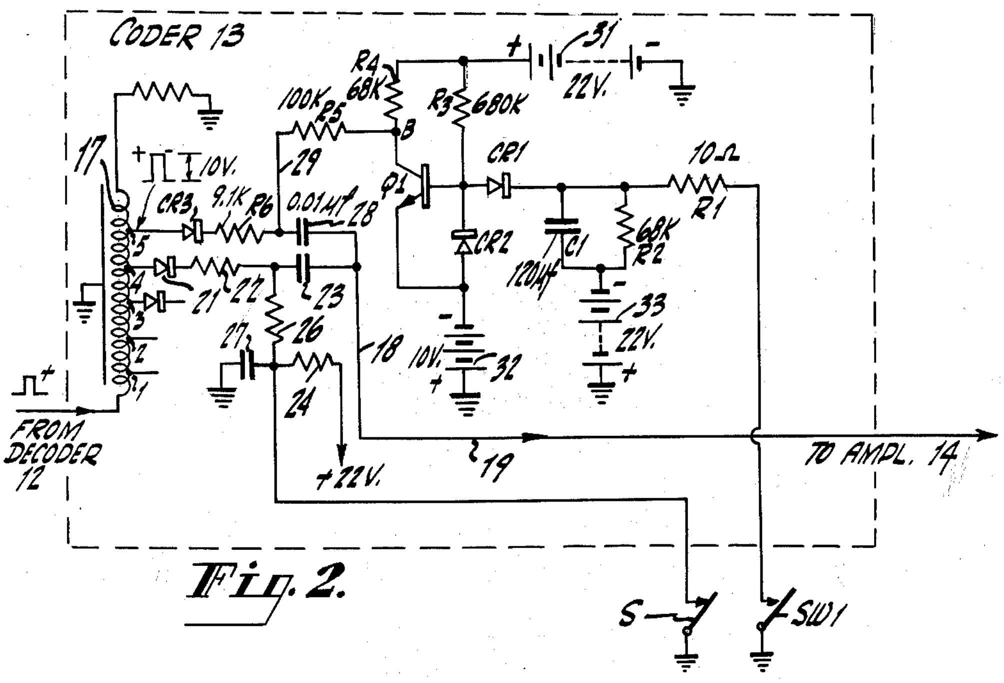
Figure 3:
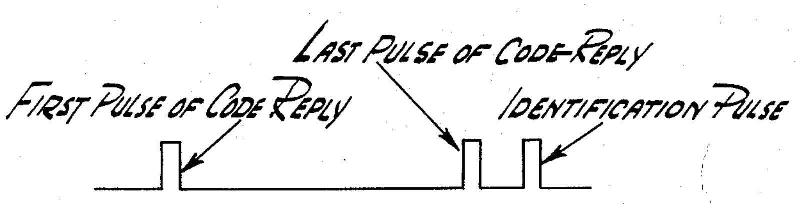

The invention will be described in detail with reference to the accompanying drawing in which, FIGURE 1 is a block diagram of a transponder embodying the invention, FIGURE 2 is a circuit diagram showing one embodiment of the invention, and FIGURE 3 is a graph illustrating a transponder reply code followed by an identification pulse.

In the several figures like parts are indicated by similar reference characters.

FIG. 1 shows in block diagram a transponder which comprises a receiver 11 for receiving an interrogation pulse code, a decoder 12, a coder 13 for producing a reply code to be transmitted in response to the interrogation, an amplifier 14 and a transmitter 16 for transmitting the reply code.

The coder includes a delay line 17 having tapped points along it from which a delayed pulse may be taken. The tap point or points from which the delayed pulse is taken is determined by selecting and closing one or more of the code setting switches S. Thus, a pulse from the decoder may be passed down the delay line, taken off two tapped points for example to obtain two pulses delayed different amounts, the two delayed pulses combined in an output circuit, and supplied to the amplifier 14 for transmission. If an identification pulse is to be transmitted, a switch SW1 is closed momentarily.

FIG. 2 shows in detail the coder including the holding circuit used for controlling the identiification pulse transmission. It is assumed that in response to interrogation a positive voltage pulse is supplied from the decoder 12 to the delay line 17 of the coder 13. The delay line 17 has a non-reflecting termination. Tap points from which the delayed pulse may be taken by closing a selected switch S are indicated at 1, 2, 3 and 4. The tap point from which an identification pulse may be taken is indicated at 5.

Delayed pulses from the selected tap points are fed through diodes to a bus bar 18 from which the combined pulses, such as two reply code pulses and an identification pulse, are supplied over an output lead 19 to the amplifier 14. Such combined pulses for reply transmission may be as shown in FIG. 3, for example. These pulses optionally can be used to gate more accurately spaced trigger pulses to the transmitter.

Only one of the code reply selecting circuits, the one from tap point 4, is shown in detail since the ones from tap points 1, 2 and 3 are the same as that from tap point 4. Referring to the circuit from tap point 4, a pulse from this point is fed through a diode 21 (when switch S is closed) a resistor 22 and a coupling capacitor 23 to the bus bar 18. With the switch S open, the diode 21 is back biased by 22 volts applied through resistors 24 and 26 to the junction point of resistor 22 and capacitor 23. The junction point of resistors 24 and 26 is connected to the switch S so that by closing switch S this point is grounded thereby removing the back bias so that diode 21 can pass a delayed pulse. A by-pass capacitor 27 is connected from the junction point of resistor 24 and 26 to ground. The resistor R22 is used to compensate for delay line variation at the selected tap.

Reference is now made to the identification pulse transmission portion of the circuit including the holding circuit. An identification pulse taken from the tap point 5 may be passed through a gate diode CR3 when a back bias is removed, and through a resistor R6 and a coupling capacitor 28 to the bus line 18.

The diode CR3 is normally back biased so that it does not pass an identification pulse. The back bias is supplied through a resistor R5 and lead 29 from the collector circuit of a transistor Q1 when the transistor Q1 is non-conducting. The collector of Q1 has a positive operating voltage, such as 22 volts, applied to it from a voltage source 31 through a resistor R4. When Q1 is biased so that it is non-conducting, the plus 22 volts appears at the point B and is supplied through R5, lead 29, and R6 to the cathode of diode CR3 to back bias it.

The back bias is removed from CR3 when the transistor Q1 is made conducting since the emitter of Q1 is connected to the negative terminal of a voltage source 32 to put the emitter negative with respect to ground. In this example the source 32 supplies 10 volts. It is evident that when the transistor Q1 is made conducting, the collector (and point B) go to a negative potential since the collector goes to a potential close to the emitter potential. Since point B goes negative, the back bias is removed from gate diode CR3 whereby it may pass the identification pulse.

The transistor Q1 is normally held non-conducting by a flow of current through a biasing diode CR2 which is connected between the emitter and the base of Q1. This current also flows through an isolating diode CR1 and through a storage circuit comprising a capacitor C1 shunted by a resistor R2. The complete circuit for this current flow includes the 10 volt source 32 and a voltage source 33, which is a source of 22 volts in this example, which has its positive terminal connected to ground and its negative terminal connected to the end of the storage circuit remote from isolating diode CR1. Since voltage sources 32 and 33 are in polarity opposition, the voltage from source 33 being the larger, there is 12 volts impressed across the series circuit comprising diodes CR2, CR1 and storage circuit C1, R2. The diodes are connected in the direction to be conducting whereby current normally flows through this series circuit. The current flow is in the direction to make the voltage drop across CR2 (about 0.4 volt) put a negative bias on the base of Q1 whereby Q1 is held non-conducting.

The positive thermal of the 22 volt source 31 is connected through a high impedance resistor R3 to the base of Q1 so that the base will go toward 22 volts positive to make Q1 conducting as soon as the bias provided by current flow through CR2 is removed.

The junction point of isolating diode CR1 and the storage circuit C1, R2 is connected through a current limiting resistor R1 to the switch SW1. In the present example R1 has a resistance of 10 ohms.

The operation of the holding circuit is as follows: The switch SW1 normally is open and the transistor Q1 is non-conducting so that diode CR3 is back biased thereby blocking the transmission of identification pulses. When the operator is requested to transmit identification pulses, he closes the switch SW1 momentarily. It may be closed for only a second or two.

As soon as switch SW1 is closed, the cathode of isolating diode CR1 is put at substantially ground potential, thus back biasing CR1. This breaks the current flow through CR2 and CR1 thereby removing the transistor bias that has been supplied by voltage drop across CR2. The base of Q1 goes toward the plus 22 volts of source 31, although it can go only slightly positive with respect to the emitter which is ten volts negative with respect to ground. The transistor Q1 now conducts and the collector (and point B) goes close to the emitter potential thereby removing the back bias from diode CR3.

So long as Q1 is conducting the identification pulses are transmitted, one identification pulse following each series of code reply pulses as illustrated in FIG. 3. The groups of pulses, such as the group in FIG. 3, occur many times a second, 500 times per second for example. The length of time that the identification pulse will be transmitted with the code reply group is determined by the time constant of the storage circuit C1, R2 and is not affected by transistor current leakage. This is because the storage circuit is isolated from the transistor Q1 and its leakage currents by the isolating diode CR1.

When the switch SW1 opens after a momentary closing, switch SW1 usually being a spring loaded switch, isolating diode CR1 remains non-conducting, and Q1 remains conducting for a predetermined period such as ten seconds as determined by the time constant of the storage circuit C1, R2. This is due to the fact that the capacitor C1 received an additional charge the instant switch SW1 was closed since this put the 22 volt source 33 across the capacitor C1. Specifically, the isolating diode side of capacitor C1 was put at ground potential by the additional charge. Immediately upon opening of the switch SW1, therefore, the isolating diode CR1 remains back biased, being back biased by ten volts.

Capacitor C1 begins to discharge through R2 upon opening of switch SW1. After a predetermined time, ten seconds in the example assumed, capacitor C1 has discharged to a point where its voltage at the cathode of isolating diode CR1 is minus ten volts. From this time on the continuing discharge of capacitor C1 causes the cathode of CR1 to be still more negative so that current again flows through the biasing diode CR2 and the diode CR1 thereby making Q1 again non-conducting. Thus the gate diode CR3 is again back biased, and the transmission of identification pulses is terminated.

In FIG. 2 certain resistor and capacitor values are given by way of example. Except for R1, the resistance values are given in thousands of ohms, the value of R2, for example, being 68,000 ohms. The values of capacitors are given in microfarads.

In the holding circuit shown in FIG. 2 the transistor Q1 is of the NPN type. In some cases it may be preferred to have the transistor of the PNP type, in which case the polarities of voltage sources 31, 32 and 33 are reversed, and the diodes CR1 and CR2 are connected to conduct in the direction opposite to that in FIG. 2. With the holding circuit otherwise unchanged, it will supply a positive polarity gating pulse during transistor conduction. This is the polarity gating pulse that is desired if the pulse applied to the delay line from the decoder is negative, the gate diode CR3 then being connected to conduct in the direction opposite to that shown in FIG. 2.

What is claimed is:

1. A holding circuit comprising in combination, a transistor having an input electrode, a storage circuit connected to said input electrode through an isolating diode, said storage circuit comprising a capacitor shunted by a resistor, means charging said capacitor in a direction tending to back bias said isolating diode, means comprising a biasing diode for holding said transistor normally cut off by current flow through said biasing diode to provide a cut-off bias, said diodes and said capacitor being connected in series conducting relation switching means for momentarily applying back bias to said isolating diode for making both of said diodes non-conducting and thereby removing said cut-off bias whereby said transistor becomes conducting and for also increasing said back bias charge of said capacitor, whereby said transistor remains conducting until said capacitor discharges sufficiently to reduce the back bias to a value that permits current flow through said diodes to resume.

2. A holding circuit comprising in combination, a transistor having an input electrode, a storage circuit connected to input electrode through an isolating diode, said storage circuit comprising a capacitor shunted by a resistor, means charging said capacitor in a direction tending to back bias said isolating diode, means comprising a biasing diode for holding said transistor normally cut off by a cut-off bias, a switch that may be closed momentarily, means responsive to the closing of said switch for momentarily removing said cut-off bias whereby said transistor becomes conducting and for applying a further back bias charge to said capacitor, means for making said back bias charge of said capacitor effective to make said isolating and biasing diodes non-conducting after said switch has been opened, whereby said transistor remains conducting until said capacitor discharges sufficiently to reduce the back bias to a value that permits current flow through said diodes to resume.

3. A holding circuit comprising in combination, a transistor having an input electrode, a storage circuit connected to said input electrode through an isolating diode, said storage circuit comprising a capacitor shunted by a resistor, a biasing diode connected to hold said transistor normally cut off by the voltage drop across said biasing diode due to current flow therethrough, means charging said capacitor through said diodes in a direction tending to back bias said isolating diode, a switch that may be closed momentarily, means responsive to the closing of said switch for momentarily removing said cut-off bias whereby said transistor becomes conducting and for applying a further back bias charge to said capacitor so that said isolating and biasing diodes are non-conducting when said switch is opened, whereby said transistor remains conducting until said capacitor discharges sufficiently to reduce the back bias to a value that permits current flow through said diodes to resume.

4. A circuit for producing a voltage pulse of a predetermined duration in response to the momentary closing of a switch, said circuit comprising a transistor having an input electrode, an output electrode and a common electrode, a load resistor through which an operating voltage is applied between said output electrode and said common electrode, an output lead connected to said load resistor, a storage circuit comprising a capacitor, a resistor shunting said capacitor, means connecting one side of said capacitor to said input electrode through an isolating diode, means including a biasing diode for biasing said transistor to a non-conducting condition when there is current flow through said biasing diode, said biasing diode, a connection, and an isolating diode being connected in the order named in series conducting relation with respect to said capacitor, said input electrode being connected to a point on said connection between said biasing and isolating diodes, a voltage source connected across said series circuit comprising said diodes and capacitor for normally causing a current flow through said diodes whereby said capacitor is charged and whereby said transistor is normally held in non-conducting condition, switching means that may be actuated momentarily for momentarily reversing said voltage source and for applying an additional back bias charge to said capacitor whereby current flow through said biasing and isolating diodes ceases, a resistor of high impedance through which a voltage of the correct polarity is applied between said input electrode and said common electrode for making said transistor conduct when current through said biasing diode ceases, whereby said transistor becomes conducting upon momentary closing of said switch and remains conducting until sufficient charge has leaked off said capacitor to permit current flow through said biasing and isolating diodes to resume and thereby return said circuit to its original condition.

5. A holding circuit for producing a voltage pulse of a predetermined duration in response to the momentary closing of a switch, said circuit comprising a transistor having an input electrode, an output electrode and a common electrode, an output circuit connected to said output electrode, a storage circuit comprising a capacitor and a resistor shunting said capacitor, means including a biasing diode for biasing said transistor to a non-conducting condition when there is current flow through said biasing diode, a resistor of high impedance through which a voltage of the correct polarity is applied between said input electrode and said common electrode for making said transistor conduct when current through said biasing diode ceases, means connecting one side of said capacitor to said input electrode through an isolating diode, said biasing and isolating diodes being connected in series conducting relation with respect to said capacitor, a voltage source connected between the other side of said capacitor and said biasing diode for normally causing a current flow through said diodes whereby said capacitor is charged and whereby said transistor is normally held in non-conducting condition, switching means that may be actuated momentarily for momentarily reversing said voltage source whereby current flow through said diodes ceases and for increasing the charge on said capacitor whereby said diodes are held non-conducting by the voltage across said capacitor after said switch is opened until sufficient charge has leaked off said capacitor to permit current flow through said biasing and isolating diodes to resume and thereby return said holding circuit to its original condition.

6. A circuit for producing a voltage pulse of a predetermined duration in response to the momentary closing of a switch, said circuit comprising a transistor having a base, a collector and an emitter, a load resistor through which an operating voltage is applied between said emitter and said collector, an output lead connected to said load resistor, a storage circuit comprising a capacitor and a resistor connected across said capacitor, one side of said capacitor being connected to said base through an isolating diode, a biasing diode connected between said base and said emitter and in series conducting relation to said isolating diode, said emitter being connected to a first voltage source to hold it at a certain potential with respect to ground, a second voltage source connected between the other side of said capacitor and ground, said second voltage source providing a larger voltage than said first voltage source, said voltage sources being of opposing polarities to provide a voltage difference that normally causes conduction through said biasing diode and said isolating diode to charge said capacitor and also to produce a voltage drop across said biasing diode that biases said transistor to cut-off condition, and switching means that may be actuated momentarily for momentarily placing the isolating diode side of said capacitor at approximately ground potential whereby current flow through said isolating and biasing diodes ceases with the result that said transistor becomes conducting and isolated from said storage circuit until sufficient charge has leaked off said capacitor to permit said biasing and isolating diodes to again become conducting to return the circuit to its original condition.

7. A pulse producing circuit for producing a voltage pulse of a predetermined duration in response to the momentary closing of a switch, said circuit comprising a transistor having a base, a collector and an emitter, a load resistor through with an operating voltage is applied between said emitter and said collector, an output lead connected to said load resistor, a storage circuit comprising a capacitor and a resistor connected across said capacitor, one side of said capacitor being connected to said base through an isolating diode, the other side of said capacitor being connected to a voltage source, a biasing diode connected between said base and said emitter and in series conducting relation to said isolating diode, said emitter being connected to a voltage source of a different voltage than said first voltage source, said voltage sources being of such opposing polarities to provide a voltage difference that normally causes conduction through said biasing diode and said isolating diode to charge said capacitor and also to produce a voltage drop across said biasing diode that biases said transistor to cut-off condition, a resistor of high impedance as compared with that of the resistor connected across said capacitor through which a voltage is applied between said base and said emitter with a polarity to make said transistor conduct when the bias from the biasing diode is removed, and switching means that may be actuated momentarily for reversing the voltage applied to said biasing and isolating diodes by said polarity opposing voltage sources and for increasing the charge on said capacitor whereby current flow through said diodes ceases with the result that said transistor becomes conducting and isolated from said storage circuit until sufficient charge has leaked off said capacitor to permit said diodes to again become conducting to return the pulse producing circuit to its original condition.

References Cited in the file of this patent

UNITED STATES PATENTS 3,018,384 Zrubeck ---------- Jan. 23, 1962
3,021,435 Keiper ---------- Feb. 13, 1962
3,033,994 Fujimoto et al. ---------- May 8, 1962